(12) United States Patent
Ivans et al.

(10) Patent No.: US 10,994,852 B2
(45) Date of Patent: May 4, 2021

(54) DOOR FOR A TILTROTOR PROPROTOR PYLON

(71) Applicant: Bell Helicopter Textron Inc., Fort Worth, TX (US)

(72) Inventors: Steven R. Ivans, Ponder, TX (US); Terry L. Gibson, Bella Vista, AR (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 449 days.

(21) Appl. No.: 15/946,439

(22) Filed: Apr. 5, 2018

(65) Prior Publication Data
US 2019/0308738 A1  Oct. 10, 2019

(51) Int. Cl.
*B64D 29/06*   (2006.01)
*B64C 29/00*   (2006.01)
*B64D 7/00*    (2006.01)
*F41H 3/00*    (2006.01)

(52) U.S. Cl.
CPC .......... *B64D 29/06* (2013.01); *B64C 29/0033* (2013.01); *B64D 7/00* (2013.01); *F41H 3/00* (2013.01)

(58) Field of Classification Search
CPC . B64C 29/0033; B64C 29/0075; B64C 27/28; B64C 15/12; B64C 27/52; B64C 1/14; B64C 1/1446; B64C 25/16; B64C 7/00; B64C 7/02; B64D 29/06; B64D 29/08; B64D 29/00
See application file for complete search history.

(56) References Cited

U.S. PATENT DOCUMENTS

| 6,260,793 | B1 | 7/2001 | Balayn et al. |
| 7,345,616 | B2 * | 3/2008 | Williams ................. F41H 3/00 250/505.1 |
| 9,174,731 | B2 | 11/2015 | Ross et al. |
| 9,199,732 | B2 | 12/2015 | Isaac et al. |
| 2003/0094537 | A1 | 5/2003 | Austen-Brown |
| 2003/0230677 | A1 | 12/2003 | Milliere |

(Continued)

FOREIGN PATENT DOCUMENTS

| EP | 1371552 A1 | 12/2003 |
| EP | 3369654 A1 | 9/2018 |

(Continued)

OTHER PUBLICATIONS

EP Communication under Rule 71(3) EPC—Intention to Grant, dated Nov. 26, 2019, by the EPO, re EP Application No. 18179179.9.

(Continued)

*Primary Examiner* — Joshua J Michener
*Assistant Examiner* — Cindi M Curry
(74) *Attorney, Agent, or Firm* — Timmer Law Group, PLLC

(57) ABSTRACT

An embodiment of the present invention provides a blocking door that is pivotally disposed on a fixed nacelle of a tiltrotor aircraft for pivoting between a stowed position when a proprotor pylon is in the substantially horizontal position and a protective blocking position in front of the proprotor pylon when the proprotor pylon is positioned in the non-horizontal position. In other aspects, there is provided a blocking door and a method of reducing infrared and/or radar signatures of rotorcraft with a rotatable proprotor.

13 Claims, 8 Drawing Sheets

(56) References Cited

U.S. PATENT DOCUMENTS

| 2013/0055881 | A1* | 3/2013 | Bird ........................ | B32B 3/08 |
| | | | | 89/36.02 |
| 2013/0221158 | A1 | 8/2013 | Binkholder et al. | |
| 2015/0040484 | A1* | 2/2015 | Olch .................... | B64C 1/1461 |
| | | | | 49/465 |

FOREIGN PATENT DOCUMENTS

| EP | 3549861 | A1 | 10/2019 |
| EP | 3549861 | B1 | 3/2020 |
| WO | 8602439 | A1 | 4/1986 |
| WO | 2011077152 | A1 | 6/2011 |

OTHER PUBLICATIONS

EP Decision to Grant, dated Feb. 27, 2020, by the EPO, re EP Application No. 18179179.9.
EP Exam Report, dated Jun. 11, 2019, by the EPO, re EP Patent App No. 18179179.9.
European Search Report, dated Nov. 29, 2018, by the EPO, re EP Patent App No. 18179179.9.
European Exam Report, dated Dec. 13, 2018, by the EPO, re EP Patent App No. 18179179.9.

* cited by examiner

DOOR FOR A TILTROTOR PROPROTOR PYLON

BACKGROUND

Technical Field

The present disclosure relates to an aircraft, and more particularly, to a tiltrotor aircraft having a fixed nacelle, and rotating proprotor pylon and further having a blocking door that is rotated in front of the proprotor pylon to block exposed features of the proprotor pylon that adversely affect infrared and radar signatures as well as to protect exposed proprotor components from damage from external sources when the proprotor pylon is positioned for operation of the aircraft in a conversion mode and helicopter mode.

Description of Related Art

Certain tiltrotor aircraft, such as the Bell V-280 Valor tiltrotor aircraft, employ a fixed engine with an associated engine nacelle on each wing and a rotatable proprotor pylon associated with a proprotor gearbox that is coupled to a respective engine output gearbox and drives the rotor blades of each proprotor. Each proprotor pylon is rotatable relative to the respective fixed nacelle to convert between a vertical flight (helicopter) mode and a forward flight (airplane) mode and vice versa. Each proprotor pylon also is rotatable to an intermediate position between the helicopter mode and the airplane mode to provide what is termed a conversion mode of operation.

Each proprotor pylon includes a pylon fairing fixed thereon to cover certain internal proprotor components during the helicopter mode of operation and the conversion mode of operation. However, in some versions of the aircraft, certain proprotor components nevertheless are exposed through openings in the pylon fairing. For example, in a particular version of a tiltrotor aircraft, forward portions of pillow blocks that rotatably support the proprotor gearbox on each wing are exposed through forwardly-facing slots in the pylon fairing when the proprotor pylon is positioned in the conversion mode and the helicopter mode of operation. The exposed pillow blocks/slots as well as gaps between the pylon fairing and the fixed nacelle during the conversion mode and the helicopter mode of operation create forward-facing cavities that adversely affect the infrared and radar signature of the aircraft.

Moreover, the exposed pillow blocks and corresponding slots as well as gaps between the pylon fairing and the fixed nacelle may be subject to damage from ballistic strikes, bird strikes, and entry of ambient environmental particulate elements such as dirt, sand, etc. during these modes of operation.

Still further, the exposed pillow blocks/slots as well as the gaps between the pylon fairing and the fixed nacelle can adversely affect aerodynamic performance of the aircraft.

There is a need to reduce the infrared and radar signatures of such aircraft as well as to protect exposed proprotor components from possible damage from ballistic strikes, bird strikes and environmental elements and reduce adverse effects on aerodynamic performance of such aircraft.

SUMMARY

In a first aspect, there is provided an aircraft, including a fixed nacelle disposed on a wing of the aircraft, a proprotor pylon disposed on the wing and rotatable relative to the fixed nacelle between a substantially horizontal position and a non-horizontal position, and a blocking door pivotally disposed on the fixed nacelle for pivoting between a stowed position when the proprotor pylon is in the substantially horizontal position and a blocking position in front of the proprotor pylon when the proprotor pylon is positioned in the non-horizontal position.

In an embodiment, there is provided a linkage connected between the blocking door and the proprotor pylon, the linkage configured such that rotation of the proprotor pylon rotates the blocking door.

In another embodiment, there is provided an actuator coupled to the blocking door and operable to rotate the blocking door.

In still another embodiment, the fixed nacelle defines a channel that receives the proprotor pylon when the proprotor pylon is rotated to the substantially horizontal position.

In yet another embodiment, the blocking door is disposed in the channel of the fixed nacelle.

In an exemplary embodiment, the blocking door includes a pivot member that is disposed on the fixed nacelle.

In an embodiment, the pivot member is a shaft.

In yet another embodiment, the blocking door is comprised of at least one of the following materials: a ceramic material, a composite material, a metallic material, and an armored material.

In an exemplary embodiment, the blocking door has a flat front surface.

In an embodiment, the blocking door further includes a first side and a second side disposed at opposite side edges of the flat front surface.

In yet another embodiment, the blocking door in the blocking position reduces at least one of the following: an infrared signature of the aircraft and a radar signature of the aircraft.

In a second aspect, there is a blocking door for an aircraft proprotor pylon, wherein the blocking door includes a pivot member for positioning on a fixed nacelle of the aircraft and a linkage configured to be connected to the proprotor pylon.

In an embodiment, the pivot member is a shaft.

In an exemplary embodiment, the blocking door includes a flat front surface.

In another embodiment, the blocking door further includes a first side and a second side disposed at opposite side edges of the flat front surface.

In still another embodiment, the blocking door is made of a material comprised of at least one of the following: a ceramic material, a composite material, a metallic material, or an armored material.

In a third aspect, there is a method of reducing infrared and/or radar signatures of rotorcraft with a rotatable proprotor pylon, the method including rotating a blocking door to a blocking position in front of the proprotor pylon that is positioned in a conversion mode or a helicopter mode of operation.

In an embodiment, the blocking door is rotated to the blocking position by linking the blocking door to the proprotor pylon for rotation with the proprotor pylon.

In another embodiment, the blocking door is rotated to the blocking position by an independent actuator.

In another embodiment, the blocking door is made of a material comprised of at least one of the following: a ceramic material, a composite material, a metallic material, or an armored material.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of a blocking door for an aircraft are described below. In the interest of clarity, all features of an actual implementation may not be described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," "front", "forwardly facing", or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
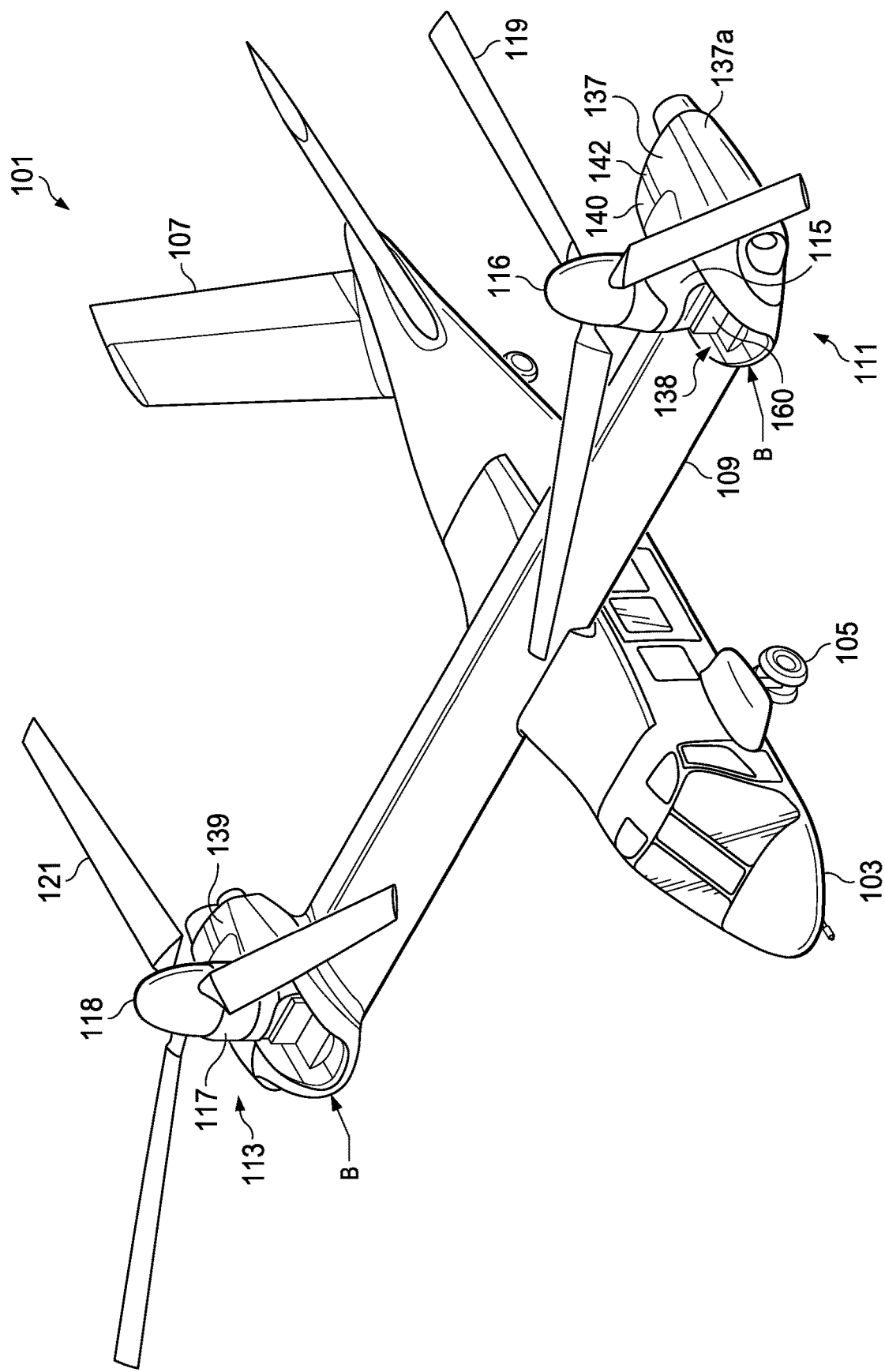
FIG. 1 is a perspective view of a tiltrotor aircraft in the vertical flight mode (helicopter mode), according to one example embodiment.
Figure 2:
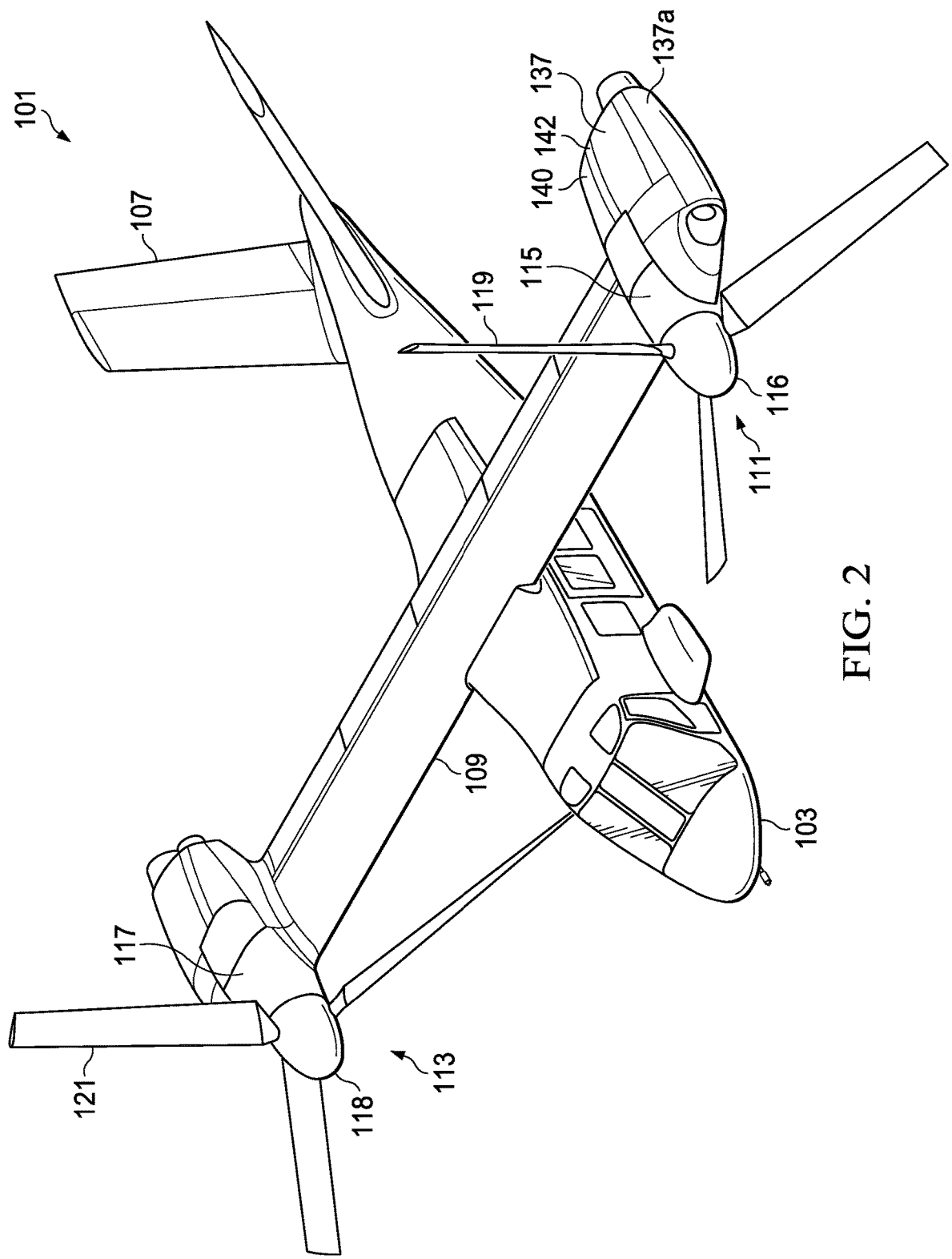
FIG. 2 is a perspective view of a tiltrotor aircraft in the forward flight mode (airplane mode), according to one example embodiment.

Referring to FIGS. 1 and 2 in the drawings, a tiltrotor aircraft 101 is illustrated. Tiltrotor aircraft 101 can include a fuselage 103, a landing gear 105, a tail member 107, and a wing member 109, a propulsion system 111, and a propulsion system 113. Each propulsion system 111, 113 includes a fixed nacelle 137, 139, and a proprotor pylon 115, 117, and a proprotor 116, 118, respectively. Each proprotor 116, 118 rotates and has a plurality of rotor blades 119, 121, respectively. The position of the proprotors 116, 118 as well as the pitch of the plurality of rotor blades 119, 121, can be selectively controlled in order to selectively control direction, thrust, and lift of the tiltrotor aircraft 101. The plurality of rotor blades 119, 121 are each driven by an output shaft in the respective proprotor 116, 118 as described in aforementioned U.S. Pat. No. 9,174,731 that is incorporated herein by reference.

FIG. 1 illustrates tiltrotor aircraft 101 in the vertical flight mode (helicopter mode), in which the proprotor pylons 115, 117 are positioned substantially vertical so the proprotors 116, 118 provide a lifting thrust. FIG. 2 illustrates tiltrotor aircraft 101 in a forward flight mode (airplane mode), in which the proprotor pylons 115, 117 are in a substantially horizontal position so the proprotors 116, 118 provide a forward thrust in which a lifting force is supplied by the wing member 109. It should be appreciated that tiltrotor aircraft can be operated such that proprotors 116, 118 are selectively positioned between the airplane mode and the helicopter mode, which can be referred to as a conversion mode. The proprotors 116, 118 are in non-horizontal positions in the vertical flight and conversion.

Propulsion systems 111, 113 are illustrated in the context of tiltrotor aircraft 101; however, propulsion systems 111, 113 can be implemented on other tiltrotor aircraft. For example, an alternative embodiment may include a quad tiltrotor that has an additional wing member aft of the wing member 109, the additional wing member can have additional propulsion systems similar to propulsion systems 111, 113. In another embodiment, propulsion systems 111, 113 can be used with an unmanned version of tiltrotor aircraft 101. Further, propulsion system 111, 113 can be integrated into a variety of tiltrotor configurations.

The propulsion system 113 is substantially symmetric to the propulsion system 111; therefor, for the sake of efficiency certain features will be disclosed only with regards to propulsion system 111. However, one of ordinary skill in the art would fully appreciate an understanding of propulsion system 113 based upon the disclosure herein of propulsion system 111.

Figure 3:
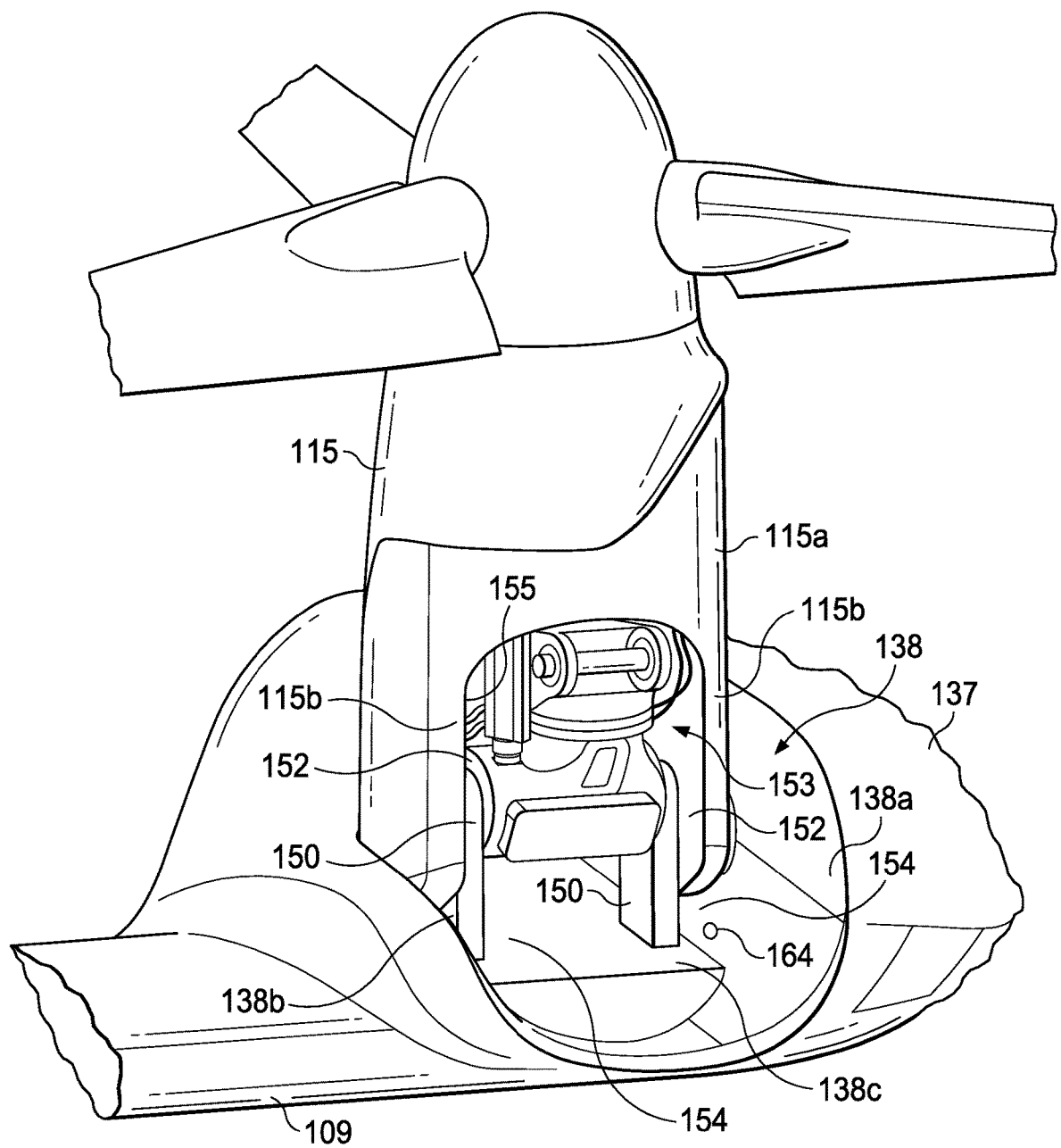
FIG. 3 is a partial perspective view of the proprotor rotated to the vertical position relative to the fixed nacelle for operation in the helicopter mode and showing exposed portions of internal components and pillow blocks that rotatably support the proprotor pylon, pillow block-receiving slots and additional gaps between the vertical proprotor pylon and the fixed nacelle.

In the illustrated embodiments, the fixed nacelle 137, the proprotor pylon 115, and the proprotor 116 are disposed on the outboard end of wing member 109. The fixed nacelle 137 is fixed relative to the wing member 109. The fixed nacelle 137 includes an engine nacelle 13a that encloses an engine, such as for example a turbine engine, and parts of a torque transfer mechanism that provides power to a proprotor gearbox. A channel 138 at the leading edge of the fixed nacelle 137 receives the proprotor pylon 115 therein. The channel 138 includes a first side 138a, a second side 138b, and a channel floor 138c. Proprotor pylon 115 is supported by a pair of pillow blocks 150 (an outboard pillow block and inboard pillow block) disposed in the channel floor 138c. Proprotor pylon 115 includes a pylon fairing 115a that covers a portion of the internal components therein. Pylon fairing 115a can include a cavity 155 that is defined laterally by pylon fairing sides 115b and permits access to internal components therein (e.g., output shaft, spindle gearbox, and wiring). Proprotor pylon 115 rotates about axis A in channel 138 as the aircraft 101 transitions between the forward flight mode (airplane mode) and the vertical flight mode (helicopter mode). When proprotor pylon 115 is in forward flight mode (airplane mode), proprotor pylon 115 is adjacent to the channel floor 138c in a horizontal position and occupies channel 138. When proprotor pylon 115 is in vertical flight mode (helicopter mode), as shown in FIG. 3, internal components 153 (e.g., output shaft, spindle gearbox, and wiring) within cavity 155 and pillow blocks 150 are exposed to ballistic strikes, bird strikes, and/or environmental elements. In addition, in vertical flight mode, openings (e.g., cavity 155, gaps adjacent to the pillow blocks 152) in channel 138 increase infrared and/or radar signature of the aircraft 101.

A rear door 140 is connected between the fixed nacelle 137 and the proprotor pylon 115, FIG. 1. The rear door 140 is movable on a track 142 in response to rotation of the proprotor pylon 115. In the forward flight mode, the rear door 140 is closed to cover the mechanical components enclosed within the fixed nacelle 137. In vertical flight mode or a conversion (transition) mode, the rear door 140 is at least partially opened to accommodate movement (rotation) of the proprotor pylon 115.

In certain exemplary embodiments, a blocking door 160 is associated with the fixed nacelle 137 for rotation to a blocking position B when the proprotor pylon 115 is positioned in the conversion mode and/or in the helicopter mode of operation, as shown in FIGS. 1 and 4A-6. The blocking position B of the blocking door 160 obstructs at least a portion of the pillow blocks 150, internal components 153, cavity 155, and/or proprotor pylon 115. In some embodiments, the blocking position B of the blocking door 160 completely obstructs the pillow blocks 150, internal components 153, and cavity 155. In an embodiment, the blocking door 160 is in a blocking position B when the blocking door 160 is at an angle K greater than zero degrees. In an embodiment, the blocking door 160 is in a blocking position B when the blocking door is at an angle K from about 10 degrees to about 90 degrees. In some embodiments, blocking door 160 is disposed anterior to proprotor pylon 115 when in a blocking position B. In certain embodiments, blocking door 160 is disposed anterior to the pillow blocks 150. In still some embodiments, blocking door 160 is disposed adjacent to the pillow blocks 150. In an embodiment, the blocking door 160 is separate from the proprotor pylon 115. In an exemplary embodiment, the blocking door 160 is laterally separated from the proprotor pylon 115 by a distance D. The blocking door 160 in the blocking position B can advantageously reduce infrared and radar signatures; protect the exposed proprotor components from ballistic strikes, bird strikes, and environmental elements; and/or reduce adverse aerodynamic effects caused by openings in the proprotor pylon 115.

The blocking door 160 can be made from a material selected from the group consisting of ceramic material, composite material, metallic material, and armored material. In certain embodiments, the blocking door 160 is shown having a flat front surface 160a that laterally terminates at edges 160b. However, the blocking door 160 can have any front surface profile, bulk shape, and dimensions in practice of embodiments of the invention in order to protect the exposed proprotor components from ballistic strikes, bird strikes and environmental elements, and reducing adverse aerodynamic effects.

Moreover, in some embodiments, blocking door 160 is configured to reduce the infrared and/or radar signature of the aircraft 101. For example, the blocking door 160 includes a front surface 160a with an infrared and/or radar blocking or absorptive coating, lamination, composite material, or surface treatment to this same end. In other embodiments, the shape of the blocking door 160 is configured to reduce the infrared and/or radar signature of the aircraft 101. For example, but not limitation, the blocking door 160 can include the front surface 160a that is flat and a first side 161a and a second side 161b disposed on opposing sides of the front surface 160a. The front surface 160a intersects with the two sides 161a, 161b at edges 160b. In some embodiments, at least one of the edges 160b is angled (as opposed to being curved). In an embodiment, at least one of the edges 160 is a linear edge. The angle of at least one of the edges 160b can be in some embodiments greater than zero degrees and less than 60 degrees. In embodiments, the angle of at least one of the edges 160b is from about 30 degrees to about 50 degrees. The angle of the edges 160b can reduce the infrared and/or radar signature of the aircraft 101.

Figure 4A:
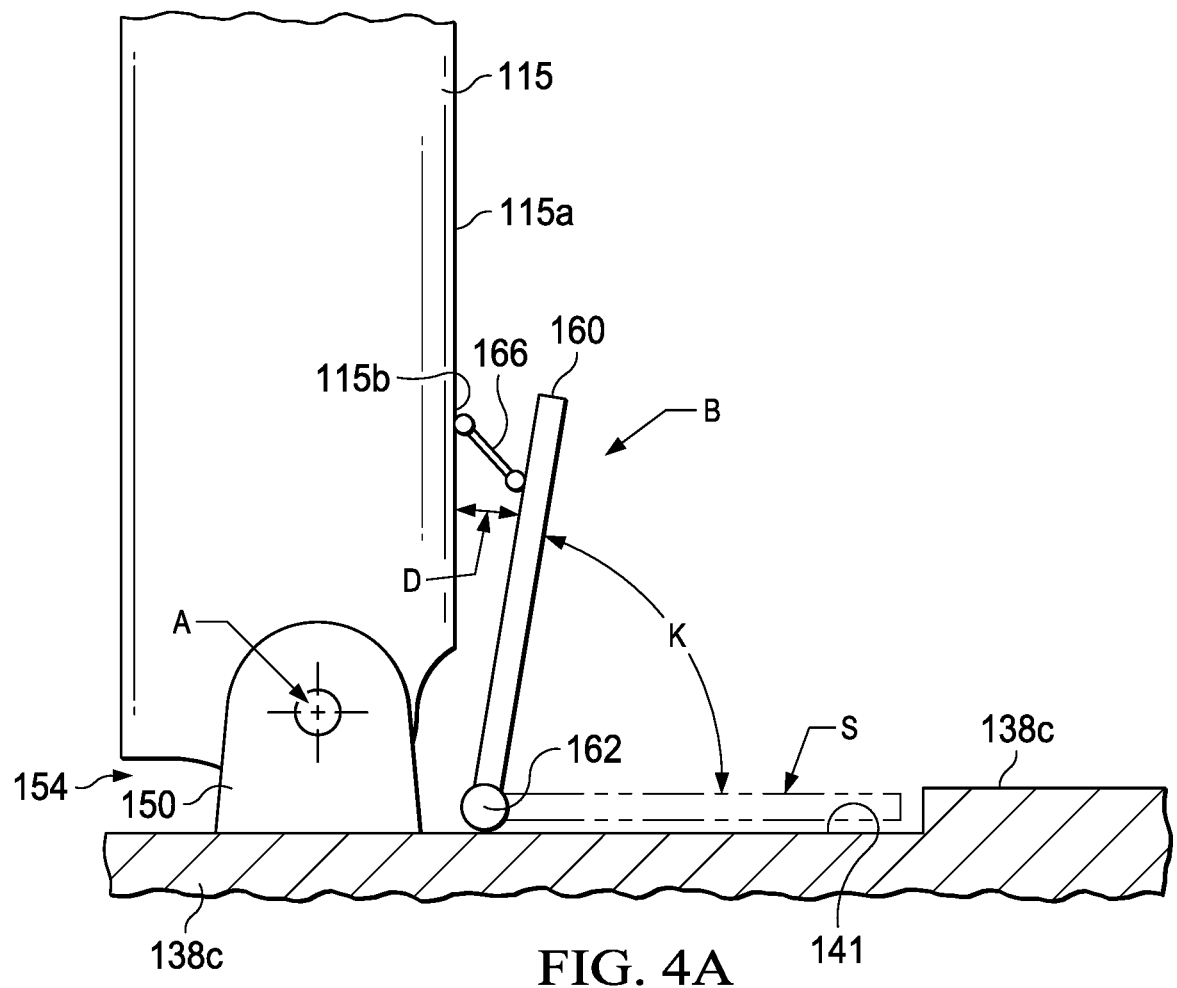
FIG. 4A is a partial side elevation of the proprotor pylon in the helicopter mode with the blocking door and pivot member shown in the vertical blocking position (solid lines) after being rotated from the folded-down (substantially horizontal), stowed position (dashed lines)

In certain embodiments, as shown in FIG. 4A, the blocking door 160 includes a pivot member 162 that is mounted on the fixed nacelle 137 to permit rotation of the blocking door 160 about the substantially horizontal axis of the pivot member 162. In an embodiment, the fixed nacelle 137 includes opposing openings 164 (one shown in FIG. 3) to rotationally receive the pivot member 162 therein. In an exemplary embodiment, the pivot member 162 is a shaft with ends received in the opposing openings 164. The openings 164 optionally may include a respective bushing, bearing, and the like to receive a respective end of the pivot member for rotation about the horizontal shaft axis. The blocking door 160 alternatively can be constructed and assembled to rotate about an axis that is substantially vertical, or at another axis, so long as the blocking door 160 can be positioned in front of the proprotor pylon 115 when the proprotor is positioned in the conversion mode and in the helicopter mode of operation.

Figure 4B:
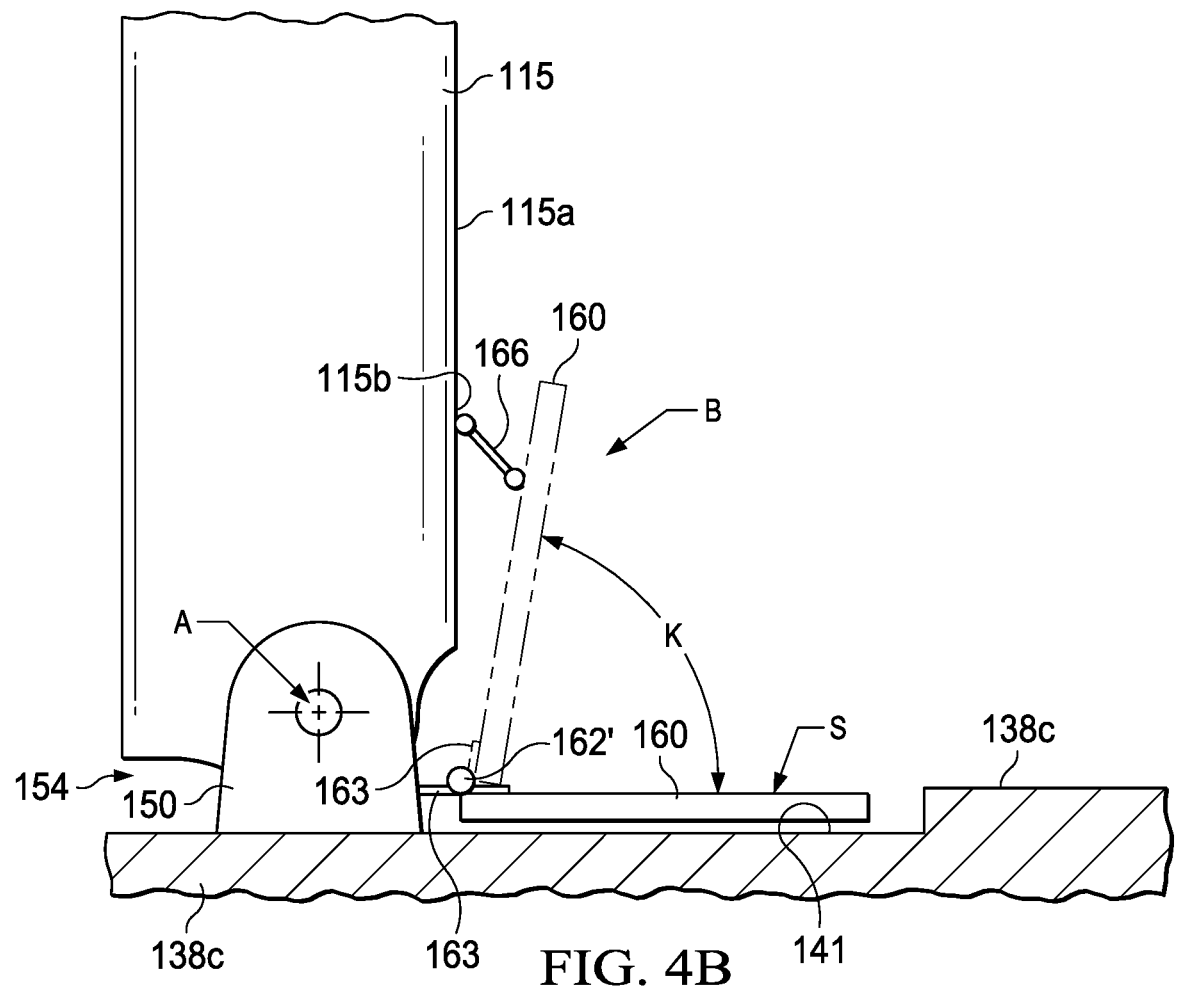
FIG. 4B is a partial side elevation of the proprotor pylon in the helicopter mode with the blocking door shown and pivot member in the vertical blocking position (solid lines) after being rotated from the folded-down (substantially horizontal), stowed position (dashed lines)

In another embodiment, as shown in FIG. 4B, the pivot member 162' can include at least one hinge or other rotational mechanism (not shown) that permits positioning of the blocking door 160 in front of the proprotor pylon 115 when the proprotor is positioned in the conversion mode and in the helicopter mode of operation. In an embodiment, the pivot member 162' includes a knuckle with pin, a first leaf connected to the blocking door, and a second leaf connected to the channel floor 138c.

Figure 5:
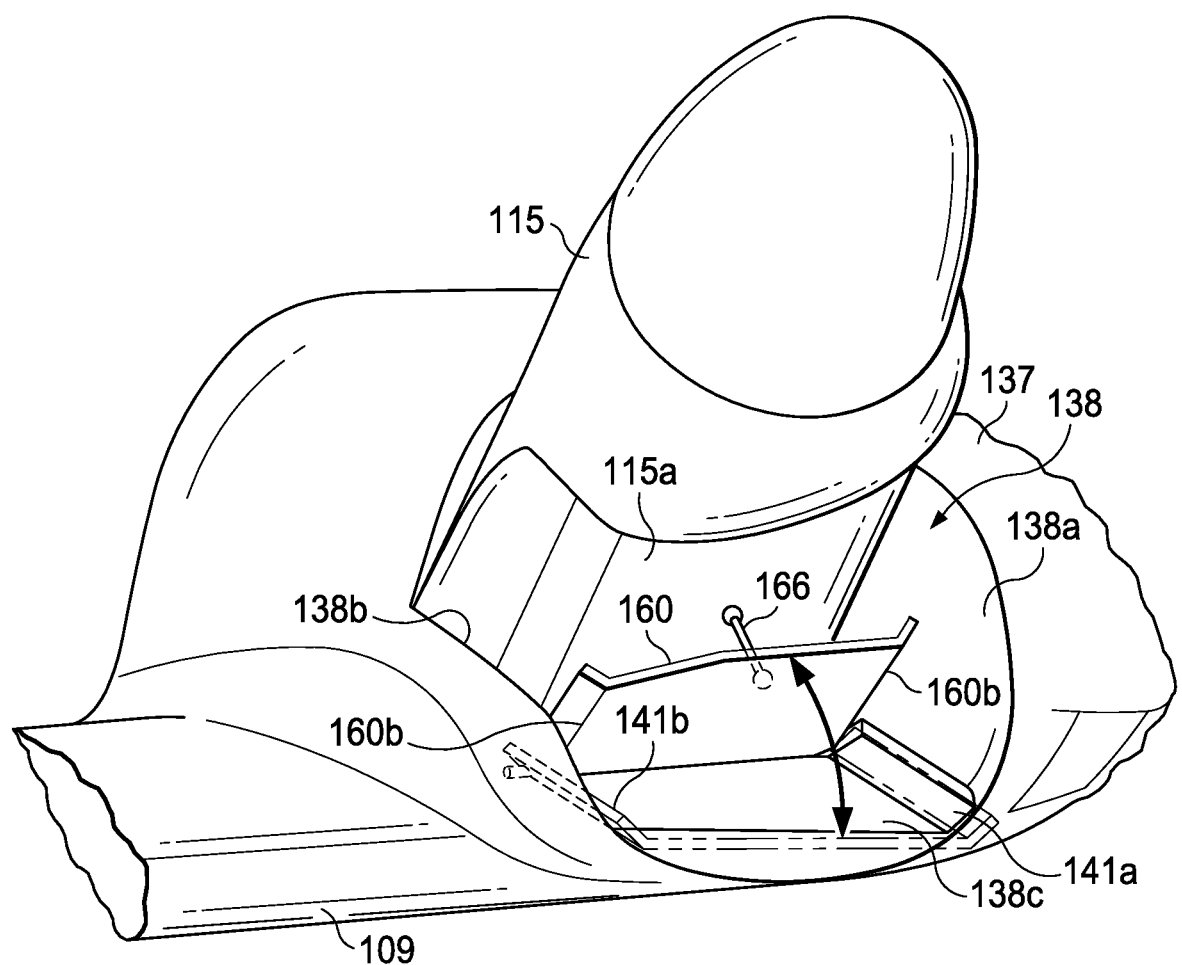
FIG. 5 is a partial perspective view of the proprotor pylon rotated relative to the fixed nacelle for operation in the conversion mode with the blocking door shown rotated with the proprotor to the partially vertical blocking position (solid lines) from the folded-down, stowed position (dashed lines)
Figure 6:
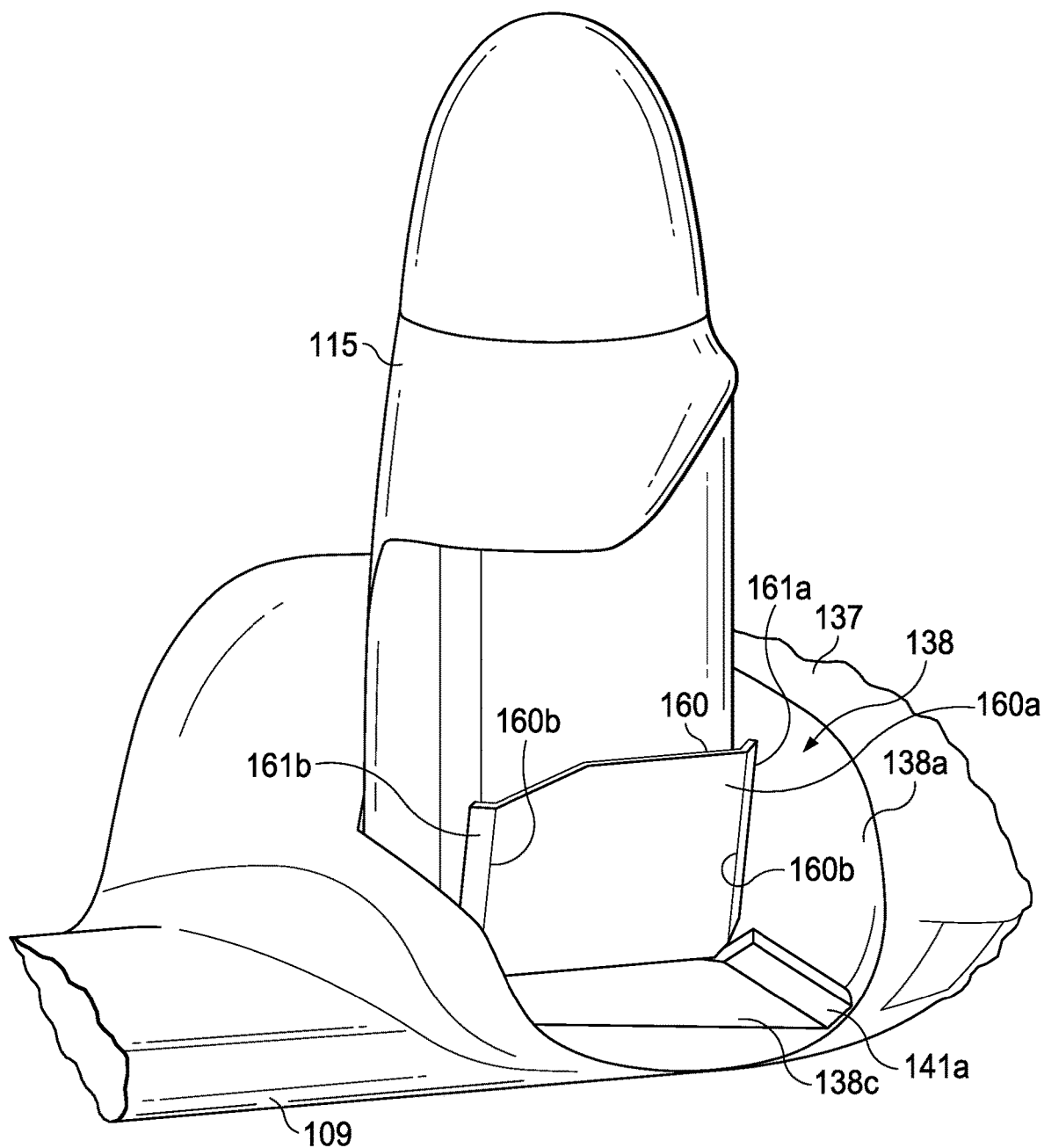
FIG. 6 is a partial perspective view of the proprotor pylon rotated to the vertical position relative to the fixed nacelle for operation in helicopter mode with the blocking door shown rotated to the vertical blocking position during helicopter mode.

Referring to FIGS. 4A-4B, in certain embodiments, a linkage 166 is connected between the blocking door 160 and the proprotor pylon 115 so that rotation of the proprotor pylon 115 rotates the blocking door via the linkage 166 from a stowed position S on the fixed nacelle 137 to the blocking position B in front of the proprotor pylon in the conversion mode and the helicopter mode, as shown in FIGS. 4-6. The linkage 166 can include, but is not limited to, a cable, strap, chain, articulated links, and other linkages connected by fasteners or other means to the blocking door 160 and to the proprotor pylon 115 so that rotation of the proprotor pylon 115 also rotates the blocking door via the linkage 166 between the stowed position S and the blocking position B in the conversion mode and the helicopter mode. In an illustrative embodiment shown in FIGS. 4A-4B, a linkage 166 can be coupled to the blocking door 160 and at least one of the pylon fairing sides 115b of the proprotor 115. In some embodiments, there can be a first and a second linkage 166 disposed on each of the pylon fairing sides 115b. In another illustrative embodiment shown in FIG. 5, a linkage 166 can be coupled to the blocking door 160 and the pylon fairing 115a. In some embodiments, a linkage 166 is omitted.

FIG. 4A illustrates the rotational motion of the blocking door 160 between the blocking position B (solid lines) to the stowed position S (dashed lines) of the proprotor pylon 115. FIG. 4B illustrates the blocking door 160 rotated from the blocking position B (dashed lines) to the stowed position S (solid lines). In an embodiment, as shown in FIGS. 4A-4B, the blocking door 160 is disposed in a recess 141 in the channel floor 138 in a stowed position S when the proprotor pylon 115 is in a forward flight (airplane) mode. In some embodiments, the blocking door 160 is disposed on the channel floor 138 in a stowed position S when the proprotor pylon 115 is in a forward flight (airplane) mode. In an embodiment, shown in FIGS. 5-6, at least a portion of the blocking door 160 (e.g., the front surface 160a) is disposed on the channel floor 138c and the first and second sides 161a, 161b of the blocking door 160 are disposed in a first and second recess 141a, 141b, respectively, in a stowed position S when the proprotor pylon is in a forward flight (airplane) mode.

FIG. 5 shows the proprotor pylon 115 rotated upward to a non-horizontal position for the conversion mode of operation with the blocking door 160 in a blocking position B (solid lines) in this conversion mode of operation. FIG. 6 shows the proprotor pylon 115 in the substantially vertical position for the helicopter mode of operation with the blocking door 160 in the blocking position B in the front of the proprotor pylon 115.

Figure 7:
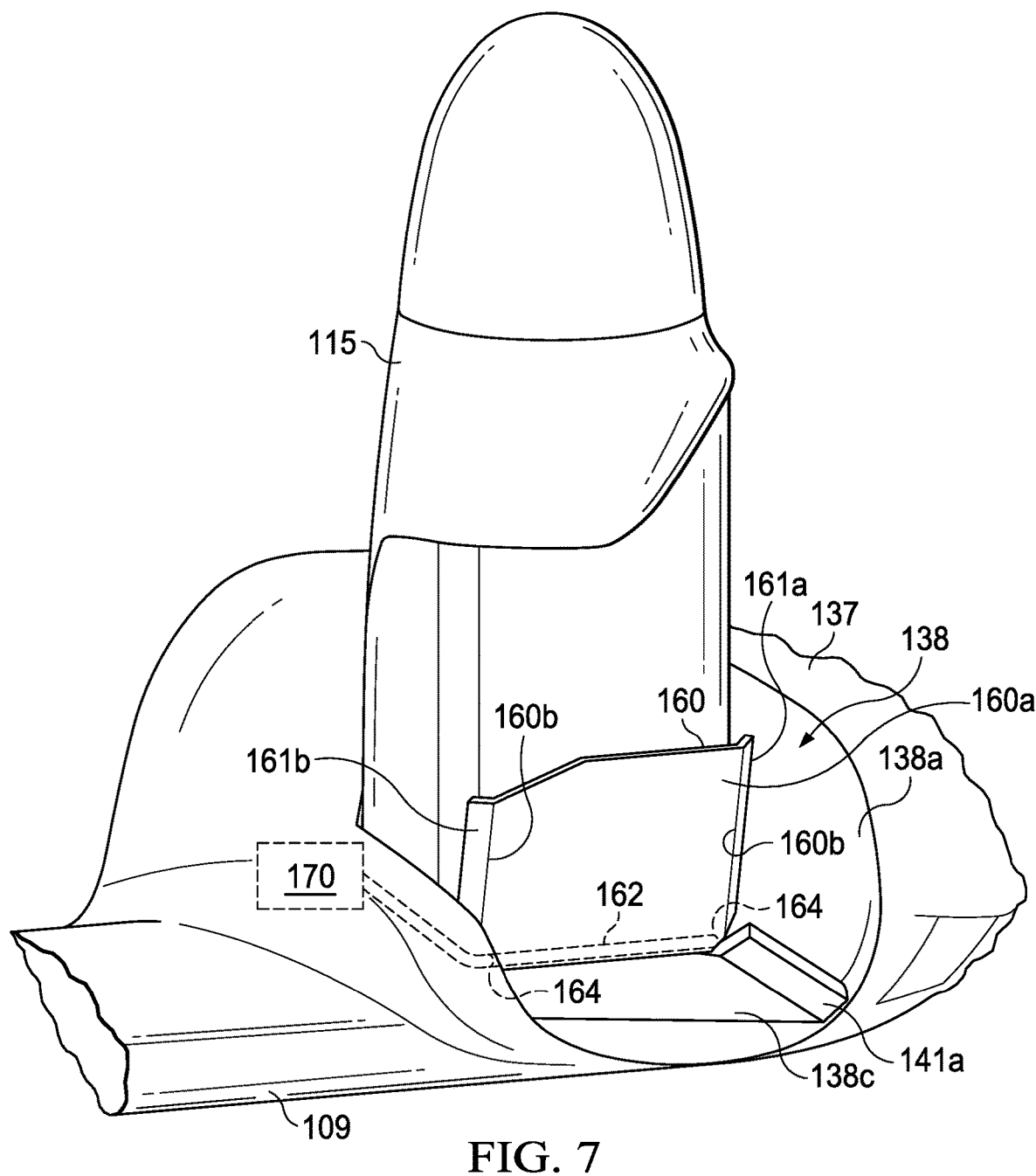
FIG. 7 is a partial perspective view of the proprotor pylon rotated to the vertical position relative to the fixed nacelle for operation in helicopter mode with the blocking door shown rotated by an actuator to the vertical blocking position during helicopter mode.

In still another embodiment, an actuator 170 (shown schematically in dashed lines) in FIG. 7 is provided to rotate the door 160 independently from the proprotor pylon 115. In some embodiments, the actuator 170 is disposed on or in the fixed nacelle 137 for independently rotating the blocking door 160 between the stowed position S and the blocking position B in front of the proprotor pylon 115 in the conversion mode and the helicopter mode of operation. The actuator 170 can be an electrical actuator, hydraulic actuator, mechanical actuator, or other actuator coupled to the blocking door 160 or coupled via a linkage to the blocking door 160. Control of the actuator 170 can be synchronized with rotation of the proprotor pylon 115 so that motion of the blocking door 160 follows the rotation of the proprotor pylon between the stowed position S and the blocking position B. Alternatively, the independent actuator 170 can be controlled to position the blocking door 160 at the blocking position B after the proprotor pylon is positioned in the substantially vertical position for the helicopter mode of operation. That is, the actuator can be controlled to move the blocking door 160 as the proprotor pylon 115 is rotated, or after the proprotor pylon 115 is fully rotated to the substantially vertical position. In an embodiment, the blocking door 160 includes only an actuator 170 and the linkage 166 is omitted.

The blocking door mechanism is especially useful for, although not limited to, tiltrotor aircraft having a fixed nacelle 137 and a proprotor pylon 115 to achieve the above-mentioned improvements in reducing infrared and radar signatures, protecting the exposed proprotor components from ballistic strikes, bird strikes and environmental elements, and reducing adverse aerodynamic effects.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Terms such as "first" and "second" are used only to differentiate features and not to limit the different features to a particular order or to a particular quantity.

At least one embodiment is disclosed and variations, combinations, and/or modifications of the embodiment(s) and/or features of the embodiment(s) made by a person having ordinary skill in the art within the scope of the disclosure. Alternative embodiments that result from combining, integrating, and/or omitting features of the embodiment(s) are also within the scope of the disclosure. Use of broader terms such as comprises, includes, and having should be understood to provide support for narrow terms such as consisting of, consisting essentially of, and comprised substantially of. Accordingly, the scope of protection is not limited by the description set out above but is defined by the claims that follow, the scope including all equivalents of the subject matter of the claims. Each and every claim is incorporated as further disclosure into the specification and the claims are embodiment(s) of the present invention.

The invention claimed is:

1. An aircraft, comprising:
   a fixed nacelle disposed on a wing of the aircraft,
   a proprotor pylon disposed on the wing and rotatable relative to the fixed nacelle between a substantially horizontal position and a vertical position;
   a channel with a channel floor disposed at the leading edge of the fixed nacelle that receives the proprotor pylon therein, when the proprotor pylon being arranged to rotate about an axis in the channel to the substantially horizontal position, wherein the proprotor pylon is adjacent to the channel floor and occupies the channel; and to the vertical position, wherein at least a portion of the channel is exposed; and
   a blocking door pivotally disposed in the channel for pivoting between a stowed position where the blocking door is disposed on the channel floor when the proprotor pylon is in the substantially horizontal position and a blocking position that is anterior to the proprotor pylon when the proprotor pylon is positioned in the vertical position.

2. The aircraft of claim 1, further including a linkage connected between the blocking door and the proprotor pylon, the linkage configured such that rotation of the proprotor pylon rotates the blocking door.

3. The aircraft of claim 1, further including an actuator coupled to the blocking door and operable to rotate the blocking door.

4. The aircraft of claim 1, wherein the blocking door includes a pivot member that is disposed on the fixed nacelle, the pivot member is anterior to the proprotor pylon when the proprotor pylon is positioned in the vertical position.

5. The aircraft of claim 4, wherein the pivot member is a shaft.

6. The aircraft of claim 1, wherein the blocking door is comprised of at least one of the following materials: a ceramic material, a composite material, a metallic material, or an armored material.

7. The aircraft of claim 1, wherein the blocking door has a flat front surface.

8. The aircraft of claim 7, wherein the blocking door further includes a first side and a second side disposed at opposite side edges of the flat front surface.

9. The aircraft of claim 1, wherein the blocking door in the blocking position reduces at least one of the following: an infrared signature of the aircraft and a radar signature of the aircraft.

10. A method of reducing infrared and/or radar signatures of rotorcraft with a rotatable proprotor pylon received in a channel with a channel floor at a leading edge of a fixed nacelle disposed on a wing of the rotorcraft, the method comprising:
    rotating a blocking door in the channel to a blocking position in front of exposed components when the proprotor pylon has been rotated relative to the fixed nacelle to a non-horizontal position in a conversion mode or a helicopter mode of operation; and
    rotating the blocking door to a stowed position where the blocking door is disposed on the channel floor when the proprotor pylon is in the substantially horizontal position.

11. The method of claim 10, wherein the blocking door is rotated to the blocking position by linking the blocking door to the proprotor pylon for rotation with the proprotor pylon.

12. The method of claim 10, wherein the blocking door is rotated to the blocking position by an independent actuator.

13. The method of claim 10, wherein the blocking door is made of a material comprised of at least one of the following: a ceramic material, a composite material, a metallic material, or an armored material.

* * * * *